United States Patent

Bush

[15] 3,706,228

[45] Dec. 19, 1972

[54] TEMPERATURE AND VELOCITY APPARATUS FOR MOVING FLUIDS

[72] Inventor: Clarence C. Bush, Bel Air, Md.

[73] Assignee: The United States of America as represented by the Secretary of the Army

[22] Filed: Jan. 5, 1971

[21] Appl. No.: 103,974

[52] U.S. Cl. ............... 73/343 R, 73/339 R, 73/344, 73/349, 73/351, 73/359
[51] Int. Cl. ....... G01k 1/14, G01k 7/00, G01k 13/02
[58] Field of Search......... 73/343 R, 351, 147, 194 E, 73/204, 359, 339 R, 341, 344, 349

[56] References Cited

UNITED STATES PATENTS 2,620,658  12/1952  Piety.................................73/204 X
3,045,487  7/1962  Raezer..............................73/339 R

FOREIGN PATENTS OR APPLICATIONS 1,084,942  7/1960  Germany..............................73/351

Primary Examiner—Louis R. Prince
Assistant Examiner—Frederick Shoon
Attorney—Harry M. Saragovitz, Edward J. Kelly and Herbert Berl

[57] ABSTRACT

In order to measure the temperature and velocity of a high speed stream of a gas such as air a temperature sensor is placed on the peripheral area of a disc wheel and the disc is positioned in the path of air flow and is spun until its periphery is traveling at the velocity of the air. The sensor, when moving downstream, has zero velocity with respect to the fast-flowing air and therefore gives a true reading of the air temperature.

8 Claims, 4 Drawing Figures

PATENTED DEC 19 1972

3,706,228

Oscillograph Trace of Temperature History

INVENTOR,
Clarence C. Bush

BY: Harry M. Saragovitz
Edward J. Kelly & Herbert Berl
ATTORNEYS.

TEMPERATURE AND VELOCITY APPARATUS FOR MOVING FLUIDS

The invention described herein may be manufactured, used, and licensed by or for the Government for governmental purposes without the payment to me of any royalty thereon.

BRIEF SUMMARY

A difficult problem is presented if we attempt to determine the static temperature of a fluid flowing at a high velocity. If a thermometer bulb were placed in the high-velocity stream there would be turbulence with compressive forces on the upstream side and subnormal forces on the downstream side of the bulb. This, in turn, causes temperature readings which are not the true temperature of the fluid, especially in supersonic wind tunnel temperature measurements.

It is possible to obtain a true static temperature reading by firing a projectile down the tunnel at the velocity of the air and carrying telemetering equipment to sense the air temperature and broadcast a corresponding signal to adjacent stationary recording equipment. The cost of the equipment is very high and the projectile destroys the sensing and broadcasting equipment for each single reading. The velocity of the projectile must exactly equal that of the surrounding high velocity air or the readings will be in error. Problems are encountered in matching the velocity of the projectile with that of the fluid. Other drawbacks are obvious. The present invention is designed to obviate those and other problems.

IN THE DRAWING

Figure 4:
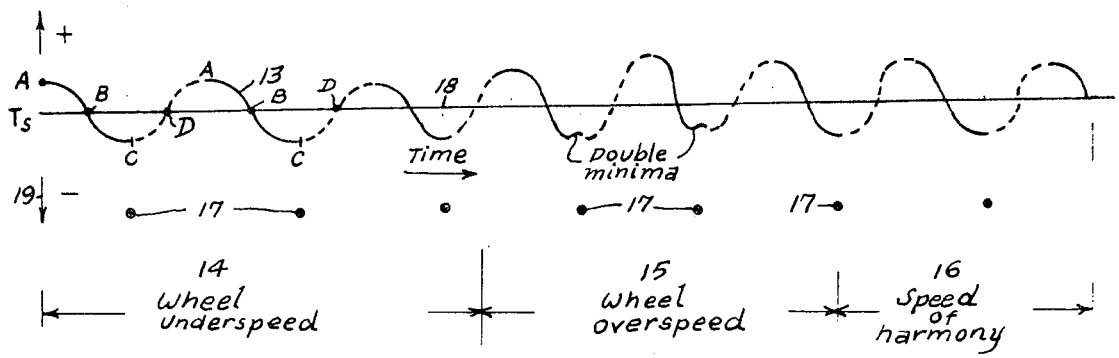
Figure 3:
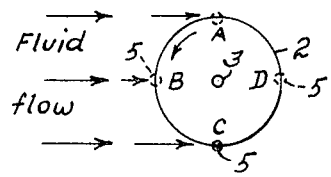

FIG. 3, on a reduced scale, illustrates the sensor at four alternative positions relative to fluid flow;

FIG. 4 is an oscillograph trace of temperatures indicated as the spinning wheel velocity is too slow, too fast, and then correct.

Figure 1:
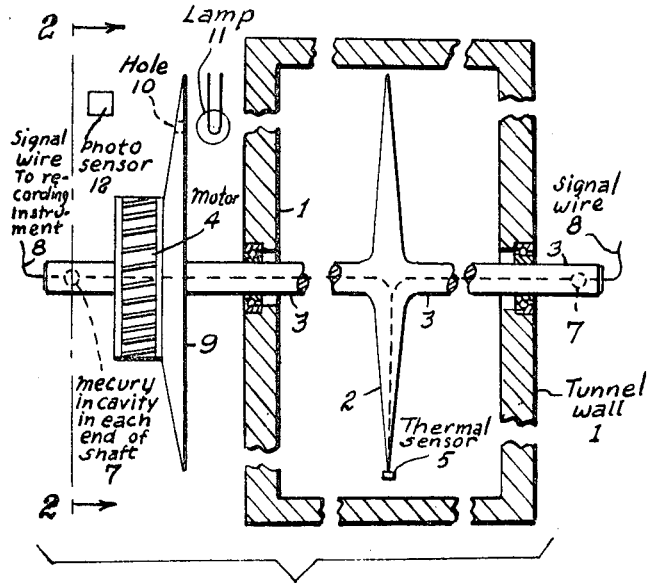
FIG. 1 is a cross section of the invention.
Figure 2:
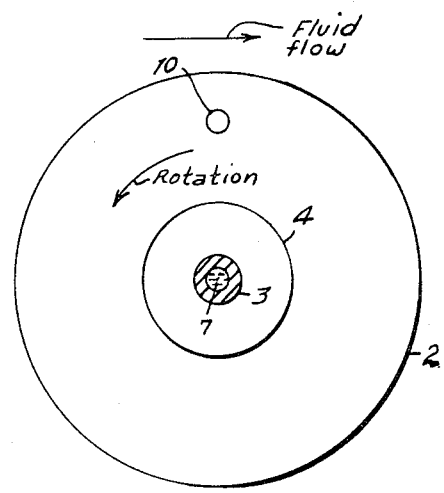
FIG. 2 is a side elevation of the apparatus along line 2—2 of FIG. 1.

In FIG. 1 tunnel walls 1 conduct flowing fluid, such as air at supersonic velocity, down past a very thin wheel 2 mounted on shaft 3. Variable speed motor 4 (e.g., air turbine, electric, or other) spins wheel 2. A thermal sensor 5 generates or modifies a signal in response to temperatures experienced as disc wheel 2 rotates and the signal is carried through wires 6 to mercury-filled cavities 7 in the shaft. Stationary wires 8, bathed in the mercury pools in cavities 7, transmit the signal to recording apparatus (not illustrated).

Wheel 9 has a hole 10 therein with a lamp 11 and photosensor 12 located on opposite sides thereof.

In FIG. 3 wheel 2, revolving counterclockwise on shaft 3, has sensor 5 mounted thereon. At position A the sensor is traveling directly into the flowing fluid. At position B it is traveling across the path of fluid flow on the upstream of windward side. At position C the sensor is traveling along with the fluid flow, and at position D it is traveling across the fluid flow on the downstream or leeward side.

In FIG. 4 an oscillograph trace 13 illustrates the output signal from temperature sensor 5 it is self generating (e.g., thin film or very fine thermocouple). Or, trace 13 could represent the trace of an externally produced carrier signal as modified by a hot wire anemometer type of sensor reacting to temperature changes. The trace section 14 represents a condition when wheel 2 is underspeed, section 15 illustrates an overspeed condition, and section 16 represents a harmonic speed condition, that is, a speed wherein sensor 5 is traveling at the same speed as the flowing fluid. Dots 17 illustrate dead-center positions of the wheel as determined by light from lamp 11 shining through hole 10 and striking photosensor 12.

OPERATION

Exemplary figures will serve to illustrate the apparatus. In order to substantially match a fluid flow rate of 2,000 feet per second a disc wheel 2 approximately 8 inches in diameter would be rotated at approximately 1,000 rev/sec (or 60,000 rpm). Then sensor 5 would be traveling at the velocity of the fluid. When traveling along the tangent of the wheel at position C in FIG. 3, in a downstream direction, there would be no relative movement between the sensor and the fluid. At this moment we want to take the temperature. As a practical matter known sensors cannot give an instantaneous true output signal perfectly related to the ambient air. However, for a response with less than 1 percent error we can use 1/36th of a millisecond. And, the sensor will remain substantially at the speed of the flowing fluid for more than 1/36th of a millisecond, say from a point 5° before to a point 5° after the "C" position or dead-center position in FIG. 3.

Now, the output of the sensor will vary somewhat as illustrated in FIG. 4. At point A the sensor is at tangency and advancing into the wind or flowing air. The temperature is at a maximum. At point B the sensor is traveling across the air flow on the upstream side. The temperature has dropped to the reference line 18 illustrated in FIG. 4. At point C the "true" temperature we want, the minimum reading, is recorded where the sensor is traveling at tangency and retreating with the wind. There is no relative velocity between the sensor and the flowing fluid. At point D the sensor is traveling across the air flow on the downstream side. Frictional forces of the air whipping by cause the temperature to rise to the reference line illustrated in FIG. 4. At point A in the next cycle the temperature is again at a maximum because the sensor is again traveling directly into the wind at approximately double the velocity of the wind.

To obtain the proper rotational speed of the wheel for harmony it is desirable to proceed from known wheel underspeed to known wheel overspeed while observing the analog trace of the temperature (voltage) on an appropriate data readout device such as an oscillograph. Oscillograph trace 13 in FIG. 4 illustrates three conditions which may be identified by observation, namely; wheel 2 and sensor 5 "underspeed," 14, wheel "overspeed," 15, and "speed of harmony," 16. The dotted line sections of the trace illustrate the leeward sensor positions and the solid line sections illustrate the windward sensor positions.

"Wheel Underspeed" (area 14):

When the wheel is "underspeed," (area 14) i.e., when the tangential velocity and speed of sensor 5 is lower than the velocity of the flowing fluid, the oscillograph trace is characterized by the following;

1. Maxima and minima occur at tangential locations where the sensor is moving directly downstream and directly upstream respectively. (This is theoretical; as a practical matter slight imperfections occur due to factors such as slow response by the sensor, flow compressibility, centrifugal flow interaction, and so on.)
2. The amplitude of the curve is compressed with maxima and minima being of lower magnitude than when the wheel and sensor are traveling faster.
3. The time interval between cycles is lengthened thereby spreading out the cycle trace along the "-Time" axis.

"Wheel Overspeed" (area 15):
1. The maxima are higher than normal.
2. The minima develop into double minima. (This phenomena is due to the sensor coming almost into harmony with the traveling fluid before dead-center with a consequent low temperature or first minima, then speeding slightly above the fluid speed and causing a slight warming at dead-center, then coming substantially into harmony again with a slight temperature drop and a second minima.)
3. The cycle time is compressed.

"Speed of Harmony" (area 16):
1. Curve is near a sine curve.
2. Maxima and minima are more pronounced than when wheel and sensor are at underspeed and not as high as at overspeed.
3. Double minima disappear.
4. Lowest minima of all positions is registered because there is no relative movement between the sensor and the flowing fluid.

Calibration:

Calibration of the apparatus may be resorted to in order to determine exactly what the amplitude of the maxima and minima should be for "speed of harmony" conditions and to determine just how much error is caused by factors such as slow response of the sensor, flow compressibility, centrifugal force interaction, and so on. Further, apparatus such as is illustrated at 10, 11 and 12 may be used to pinpoint the precise instant that the sensor is at the point of tangency when it is moving perfectly in the direction of the flowing fluid (we might call this dead-center). When the light flashes through hole 10 and registers on photosensor 12 we know that sensor 5 is traveling parallel with the flowing fluid. This instant is fed to the oscillograph, as dot 17 for example, to show whether the trace is timed perfectly with the sensor dead-center position. If the dots do not correspond perfectly with the maxima the degree of displacement is noted for the purpose of calibrating the instrument and apparatus for various speeds, flow rates, fluids being used and so on.

When the sensor is traveling in harmony with the flowing fluid it is easy to compute the velocity as a direct function of the wheel diameter and rpm. Thus, the apparatus may be used as a wind speedometer, as well as a sensor of the static air temperature.

The temperature being sensed by sensor 5 will affect the strength of the signal fed to the oscillograph and the vertical position of the trace 13 on the temperature scale Ts 19. After calibrating the system we know what temperature is represented by the trace depending on how far up the scale 19 the trace appears.

Motor 4, the speed being variable, can spin wheel 2 and sensor 5 at any velocity (too slow, too fast or in harmony with fluid flow).

I claim:

1. The method of measuring the temperature of a flowing fluid which comprises the steps of placing a temperature sensor in the stream of flowing fluid, rotating the sensor in a single direction in a plane parallel to the direction of fluid flow at a speed where its tangential velocity is substantially equal to the velocity of the flowing fluid, and monitoring the output of the temperature sensor while it is traveling substantially downstream at approximately the velocity of the fluid.

2. The method of claim 1 and the further step of alternately increasing and decreasing the velocity of the rotating sensor to vary the sensor output, and selecting the output corresponding with harmony between sensor travel and fluid flow to represent the static fluid temperature.

3. Apparatus for measuring the temperature of a flowing fluid comprising a sensor, means mounting said sensor in a stream of flowing fluid to rotate in a single direction therein in a plane parallel to the direction of fluid flow, and means to monitor the temperature sensed by said sensor at the period of its rotation when it is traveling substantially in harmony with the fluid to thereby monitor the static temperature of the flowing fluid.

4. Apparatus as in claim 3 and means to rotate said sensor at variable speeds including the speed wherein said sensor is in harmony with the flowing fluid.

5. Apparatus as in claim 4 and means to indicate the dead-center of travel of said sensor, i.e., the point at which said sensor is traveling directly downstream with said flowing fluid.

6. Apparatus as in claim 3 and mercury filled closed cavities in the rotating means mounting said sensor, and stationary signal transmitting wires bathed in said mercury.

7. The measuring apparatus of claim 3 in which the sensor mounting means comprises a rotary wheel having a thin periphery, the sensor being mounted adjacent the periphery of the wheel.

8. The measuring apparatus of claim 3 in which the sensor mounting means comprises an axle traversing the stream of flowing fluid, a thin wheel carried by the axle within the stream of fluid, the sensor being mounted adjacent the periphery of the wheel, means to rotate the axle, and means carried by said axle at a point outside of the stream of fluid to indicate the point in the rotation of the wheel at which the sensor is traveling directly downstream of the flowing fluid.

* * * * *